United States Patent
Han et al.

(10) Patent No.: US 8,401,095 B2
(45) Date of Patent: Mar. 19, 2013

(54) APPARATUS FOR TRANSMITTING DATA USING CARRIERS AND METHOD THEREOF

(75) Inventors: Seung Hee Han, Seoul (KR); Min Seok Noh, Seoul (KR); Yeong Hyeon Kwon, Gyeonggi-do (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 12/159,079

(22) PCT Filed: Dec. 27, 2006

(86) PCT No.: PCT/KR2006/005764
§ 371 (c)(1),
(2), (4) Date: Oct. 24, 2008

(87) PCT Pub. No.: WO2007/075044
PCT Pub. Date: Jul. 5, 2007

(65) Prior Publication Data
US 2009/0074093 A1 Mar. 19, 2009

(30) Foreign Application Priority Data
Dec. 27, 2005 (KR) ........................ 10-2005-0130570

(51) Int. Cl.
*H04K 1/10* (2006.01)
(52) U.S. Cl. ........ 375/260; 375/259; 375/262; 375/267; 375/295; 375/342
(58) Field of Classification Search .................. 375/135, 375/146, 219, 260, 271, 278, 286, 295, 296, 375/299, 302, 316, 322, 342, 343, 346, 358, 375/306, 220, 259, 261, 267, 324, 350
See application file for complete search history.

(56) References Cited

U.S. PATENT DOCUMENTS

| | | | | |
|---|---|---|---|---|
| 6,493,399 | B1 * | 12/2002 | Xia et al. | 375/296 |
| 7,433,419 | B2 * | 10/2008 | Yun et al. | 375/296 |
| 7,813,330 | B2 * | 10/2010 | Yu et al. | 370/342 |

(Continued)

FOREIGN PATENT DOCUMENTS

| | | |
|---|---|---|
| EP | 1113638 A2 | 7/2001 |
| EP | 1331780 A1 | 7/2003 |

(Continued)

OTHER PUBLICATIONS

Zhiqian Liu (Linear constellation Precoding for OFDM with Maximum Multipath Diversity and Coding Gains) IEEE Transactions on Communication; vol. 51, No. 3, Mar. 2003.*

(Continued)

*Primary Examiner* — Hirdepal Singh
(74) *Attorney, Agent, or Firm* — Lee, Hong, Degerman, Kang & Waimey (57) ABSTRACT

An apparatus for transmitting data using a plurality of carriers and method thereof are disclosed, by which PAPR improving effect is enhanced. A method of generating an OFDM signal, which is transmitted by spreading data symbols using a DFT (Discrete Fourier Transform) matrix, according to the present invention includes the steps of generating an output symbol by data-processing the data symbols in time domain in a manner of giving a specific weight to the data symbols and summing up the weight-given data symbols and generating the OFDM signal by performing OFDM data processing on the output symbol.

6 Claims, 5 Drawing Sheets

U.S. PATENT DOCUMENTS

| | | | |
|---|---|---|---|
| 7,903,609 B2 * | 3/2011 | Zheng et al. | 370/329 |
| 2003/0185310 A1 * | 10/2003 | Ketchum et al. | 375/259 |
| 2005/0147176 A1 * | 7/2005 | Yun et al. | 375/260 |
| 2006/0085497 A1 * | 4/2006 | Sehitoglu | 708/405 |
| 2006/0098568 A1 * | 5/2006 | Oh et al. | 370/206 |
| 2007/0004465 A1 * | 1/2007 | Papasakellariou et al. | 455/571 |
| 2008/0043857 A1 * | 2/2008 | Ribeiro Dias et al. | 375/260 |
| 2009/0175160 A1 * | 7/2009 | Iraji et al. | 370/208 |

FOREIGN PATENT DOCUMENTS

| | | |
|---|---|---|
| EP | 1463251 A2 | 9/2004 |
| WO | 02/093779 | 11/2002 |
| WO | 2005043851 A1 | 5/2005 |

OTHER PUBLICATIONS

Zhihong Hong (Space-Time Block Codes based on Precoding; Globecom 2003), IEEE 0-7803-7974-8/03, pp. 636-640.*

Huawei, "Text proposal on PAPR reduction for SC-FDMA," R1-051197, 3GPP TSG RAN WG1 #42bis, Oct. 2005, XP-050100800.

Huawei, "Optimum family of spectrum-shaping functions for PAPR reduction in SC-FDMA," R1-051434, 3GPP TSG RAN WG1 #43, Nov. 2005, XP-050101025.

InterDigital Communications Corporation, "Uplink MIMO SC-FDMA Scheme for EUTRA," R1-051368, 3GPP TSG RAN WG1 #43, Nov. 2005, XP-050100964.

Institute for Infocomm Research (I2R) et al., "MIMO Transmission Techniques for E-UTRA," R1-051399, 3GPP TSG RAN WG1 #43, Nov. 2005, XP-050100991.

V. Tarokh et al., "Space-Time Block Codes from Orthogonal Designs," IEEE Transactions on Information Theory, vol. 45, No. 5, Jul. 1999, XP-011027408.

* cited by examiner

APPARATUS FOR TRANSMITTING DATA USING CARRIERS AND METHOD THEREOF

CROSS-REFERENCE TO RELATED APPLICATIONS

This application is the National Stage filing under 35 U.S.C. 371 of International Application No. PCT/KR2006/005764, filed on Dec. 27, 2006, which claims the benefit of earlier filing date and right of priority to Korean Application No. 10-2005-0130570, filed on Dec. 27, 2005.

TECHNICAL FIELD

The present invention relates to a data transceiving method in a communication system, and more particularly, to an apparatus for transmitting data using a plurality of carriers and method thereof.

Although the present invention is suitable for a wide scope of applications, it is particularly suitable for transceiving data by considering PABR in an orthogonal frequency division multiplexing (hereinafter abbreviated OFDM) based communication system.

BACKGROUND ART

Recently, the demand for high-speed data transmissions rises. And, OFDM, which is suitable for a scheme advantageous for the high-speed transmission, has been adopted as a transmission scheme for various high-speed communication systems. In the following description, OFDM (orthogonal frequency division multiplexing) is explained. A basic principle of OFDM lies in diving a high-rate data stream into a great number of slow-rate data streams and transmitting the slow-rate data streams simultaneously using a plurality of carriers. In this case, each of a plurality of the carriers is called a subcarrier. Since orthogonality exists between a plurality of the carriers of OFDM, even if frequency components of the carriers are mutually overlapped, they can be detected by a receiving side. The high-rate data stream is converted to a plurality of slow-rate data streams via a serial-to-parallel converter, a plurality of the parallel-converted data streams are multiplied by subcarriers, respectively, the multiplied data streams are summed up together, and the corresponding sum is then transmitted to the receiving side. So, OFDMA is a multiple access scheme to assign subcarriers to an overall band according to a data rate requested by multiple users in OFDM.

The OFDM communication scheme is to carry out signal processing smoothly in a manner of transforming a channel into flat-fading by performing signal processing in frequency domain on a channel having frequency-selective fading phenomenon. Owing to such an advantage, the OFDM communication scheme is widely used by various wireless communication systems. Yet, a problem of PAPR (peak to average power ratio) is still unsolved. The higher PAPR becomes, the larger a linear section of a power amplifier of an output end should get. A power amplifier having a large liner section is expensive in general. Yet, a cheap power amplifier is used for wire/wireless communications to reduce a product cost of terminal, whereby an output range is narrowed. So, distortion of OFDM signal is inevitable.

To solve the PAPR problem, various methods have been proposed. In this case, the various methods can be classified into PAPR reducing schemes (selective mapping, partial transmit sequence, clipping & filtering, etc.) capable of not affecting OFDM system performance and signal generating schemes (signal carrier-FDMA, offset DFT-spreading-OFDM, etc.) reducing OFDM system performance slightly or improving performance of signal itself. The PAPR enhancing method without affecting the OFDM system performance still has a problem of communication capacity reduction attributed to additional information sending. Besides, the method of changing the signal generating scheme lowers a decoding rate of data to degrade performance.

SC-FDMA (single carrier-FDMA) according to a related art is explained as follows.

Figure 1:
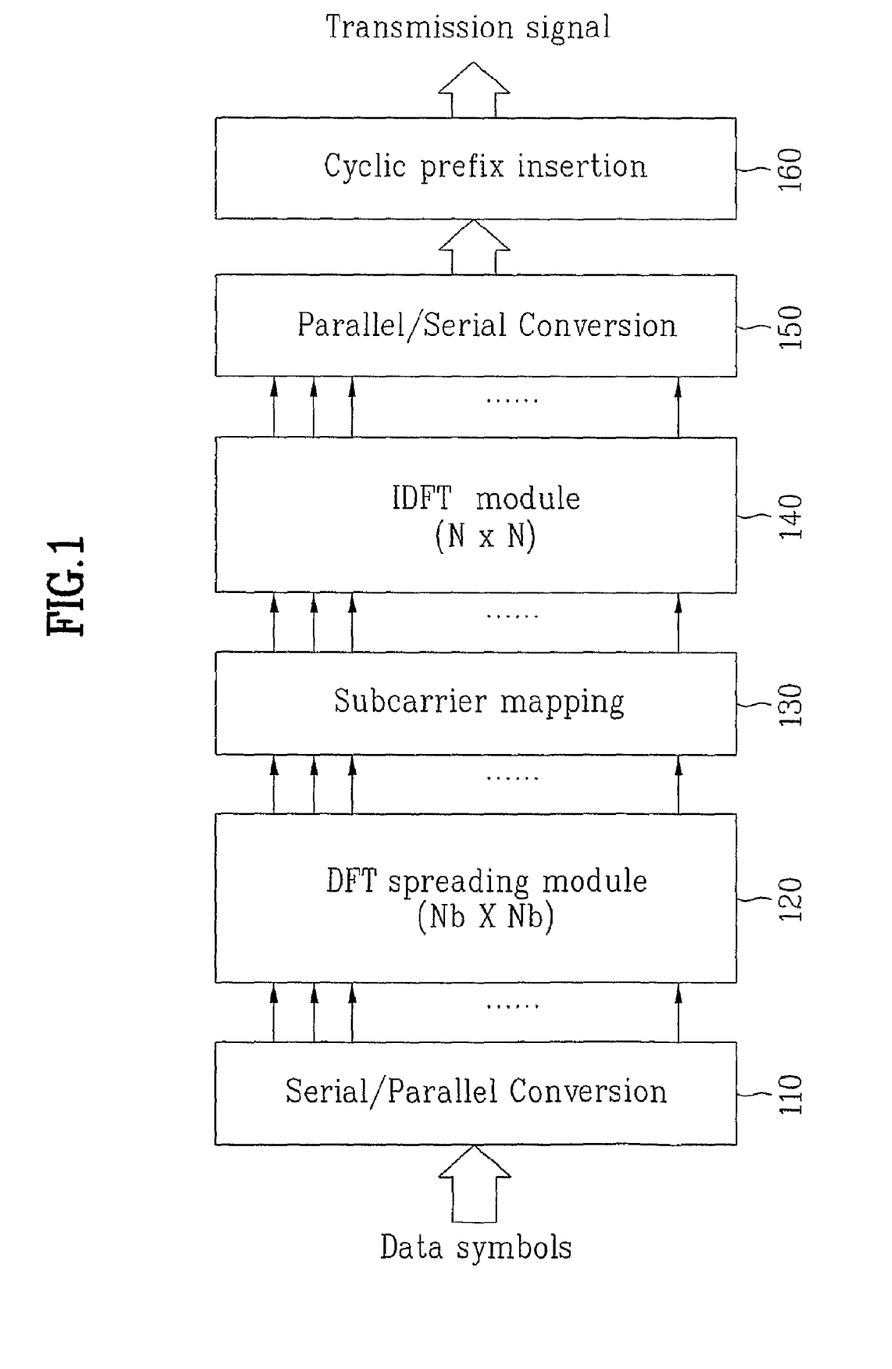
FIG. 1 is a block diagram of a SC-FDMA transmitter according to a related art.

First of all, the related art SC-FDMA is the scheme mainly applicable to uplink. In the SC-FDMA, spreading is first applied in a frequency domain by DFT matrix before generating an OFDM signal, the corresponding result is modulated by the related art OFDM, and the modulated result is then transmitted. FIG. 1 is a block diagram of a SC-FDMA transmitter according to a related art.

To explain the SC-FDMA scheme, several variables are defined. 'N' indicates a number of subcarriers carrying OFDM signal, 'Nb' indicates a number of subcarriers for a random user, 'F' indicates Discrete Fourier Transform matrix, i.e., DFT matrix, 's' indicates a data symbol vector, 'x' indicates a data-spread vector in frequency domain, and 'y' indicates an OFDM symbol vector transmitted in time domain.

In SC-FDMA, data symbol (s) is spread using DFT matrix before being transmitted. This is represented as Formula 1.

$$x = F_{N_b \times N_b} s$$

In Formula 1, $F_{N_b \times N_b}$ is an $N_b$ by $N_b$ DFT matrix used to spread data symbol (s). Subcarrier mapping is performed on the spread vector (x) by a predetermined subcarrier assigning scheme and a signal to be transmitted to a receiving side is obtained from transforming the corresponding result into a time domain by IDFT module. A transmission signal transmitted to the receiving side is represented as Formula 2.

$$y = F^{-1}{}_{N \times N}$$

In Formula 2, $F^{-}{}_{N \times N}$ is an N by N DFT matrix used to convert a frequency-domain signal to a time-domain signal. A cyclic prefix is inserted in a signal 'y' generated by the above method to be transmitted. And, a method of generating a transmission signal and transmitting the signal to a transmitting side in the above manner is called SC-FDMA.

Offset DFT spreading OFDM results from improving the SC-FDMA. The offset DFT spreading OFDM performs DFT spreading processing by dividing a data symbol through constellation mapping into a real number and an imaginary number, i.e., an inphase element and a quadrature element. Since an amplitude of each of the real and imaginary elements is Nb, the real and imaginary elements are spread using 2Nb-amplitude DFT matrix. An output amounting to a amplitude Nb is discarded from an output spread by the DFT matrix. The rest of the output amounting to the Nb amplitude is transformed into a time domain signal and is then transmitted to a receiving side.

DISCLOSURE OF THE INVENTION

Accordingly, the present invention is directed to an apparatus for transmitting data using a plurality of carriers and method thereof that substantially obviate one or more of the problems due to limitations and disadvantages of the related art.

An object of the present invention is to provide an apparatus for transmitting data using a plurality of carriers and method thereof, by which PAPR improving effect is enhanced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of generating an OFDM signal, which is transmitted by spreading data symbols using a DFT (Discrete Fourier Transform) matrix, according to the present invention includes the steps of generating an output symbol by data-processing the data symbols in time domain in a manner of giving a specific weight to the data symbols and summing up the weight-given data symbols and generating the OFDM signal by performing OFDM data processing on the output symbol.

To further achieve these and other advantages and in accordance with the purpose of the present invention, in a transmitter transmitting an OFDM signal by spreading data symbols using a DFT (Discrete Fourier Transform) matrix, an OFDM transmitting apparatus includes a precoding module processing the data symbols in time domain, the precoding module generating an output symbol by giving a specific weight to the data symbols and summing up the weight-given data symbols, and an OFDM transmitting module transmitting the output symbol to a receiver using a plurality of subcarriers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

First of all, the present invention is proposed to enhance PAPR reduction effect of the related art spreading in frequency domain. For this, one embodiment of the present invention is characterized in performing spreading or precoding in time domain on a data symbol to be transmitted. In particular, the present embodiment is characterized in transforming a data signal vector to be transmitted using a precoding matrix, spreading the transformed result in frequency domain and executing an OFDM signal generating process.

Figure 2:
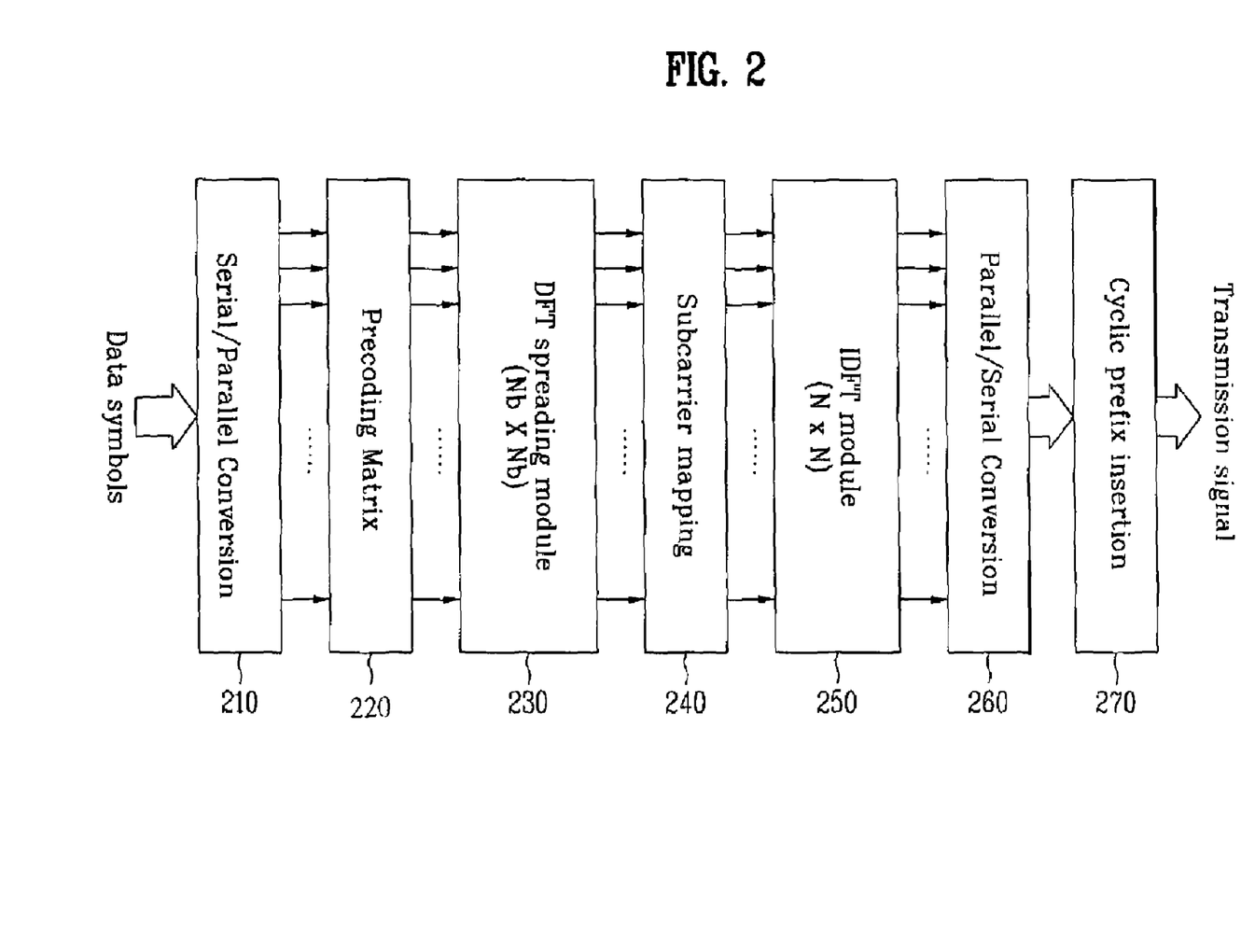
FIG. 2 is a block diagram of a transmitter performing precoding in time domain according to an embodiment of the present invention.

FIG. 2 is a block diagram of a transmitter performing precoding in time domain according to an embodiment of the present invention.

Referring to FIG. 2, data symbols to be transmitted are transmitted via a transmitter. And, a transmitter according to an embodiment of the present invention includes a serial-to-parallel converting unit 210 converting an serial input sequence to a parallel output sequence, a precoding module 220 performing spreading and coding in time domain on a data symbol vector converted to parallel, a DFT spreading module 230 performing spreading in frequency domain using Nb by Nb DFT matrix, a subcarrier mapping module 240 assigning the spread data vector to at least one subcarrier, an IDFT block 250 transforming a frequency domain data signal to a time domain signal, a parallel-to-serial converting unit 260 converting a parallel signal to a serial signal to output, and a cyclic prefix inserting unit 270 inserting a guard interval to eliminate interference between OFDM symbols.

The subcarrier mapping module 240, the IDFT block 250, the parallel-to-serial converting module 260 and the cyclic prefix inserting unit 270 correspond to the related art transmitting device that transmits a specific data symbol through a plurality of orthogonal subcarriers. For convenience of explanation, a procedure of generating an OFDM signal in the related art transmitting device is called OFDM data processing. And, it is apparent to those skilled in the art that the related art transmitting device can be modified in such a manner that additional devices are added according to a communication environment and the like.

In the embodiment of the present invention, the precoding module 220 in time domain is applied to reduce PAPR. The precoding module 220 performs precoding in time domain on data symbols. Since FIG. 2 shows that the precoding module 220 is provided next to the serial-to-parallel converting module 210, the precoding module 220 manipulates the data symbol converted to parallel by the serial-to-parallel converting module 210 in time domain. The precoding generates an output signal that is precoded in a manner of applying a specific weight to each element of the parallel data symbol and adding up the weighted data signals. If the weight is represented as a vector, an output of the precoding can be represented as a linear combination between the parallel data vector and the weight vector. For instance, if Nb=4, assuming that an input of the precoding module 220 is $[x_1, x_2, x_3, x_4]^T$, it is able to represent an output of the precoding module as $[(w_{11} \cdot x_1 + w_{12} \cdot x_2 + w_{13} \cdot x_3 + w_{14} \cdot x_4), (w_{21} \cdot x_1 + w_{22} \cdot x_2 + w_{23} \cdot x_3 + w_{24} \cdot x_4), (w_{31} \cdot x_1 + w_{32} \cdot x_2 + w_{33} \cdot x_3 + w_{34} \cdot x_4), (w_{41} \cdot x_1 + w_{42} \cdot x_2 + w_{43} \cdot x_3 + w_{44} \cdot x_4)]^T$. Namely, a parallel data vector is $[x_1, x_2, x_3, x_4]$, the weight vectors are $[w_{11}, w_{12}, w_{13}, w_{14}]$, $[w_{21}, w_{22}, w_{23}, w_{24}]$, $[w_{31}, w_{32}, w_{33}, w_{34}]$ and $[w_{41}, w_{42}, w_{43}, w_{44}]$, and an output of the precoding module 220 is generated from a linear combination between the parallel data vector and the weight vector. The precoding is discriminated from channel coding in that a redundancy bit is not added. Namely, a size (i.e., dimension of vector) of data vector does not change before and after the precoding.

The precoding can be executed by matrix operation according to precoding matrix. In the present embodiment, it is preferable that a data symbol is multiplied in time domain by a precoding matrix prior to applying the spreading by DFT. The multiplication of the precoding matrix in time domain is discriminated from the method of generating a signal by multiplying a precoding matrix used to give frequency diversity or a weight matrix used for beam forming or multiplexing in a multi-antenna system.

A method of executing the precoding using the precoding matrix ($T_p$) is explained as follows.

First of all, a data symbol (s) can be precoded through a precoding matrix according to Formula 3.

$$s_p T_p s \qquad [\text{Formula 3}]$$

In Formula 3, '$T_p$' is a precoding matrix and its formation can vary according to the object pursued by the matrix.

A pre-coded vector ($S_p$) being coded by Formula 3 is spread in frequency domain according to Formula 1 and is then transformed into a final OFDM symbol formation according to Formula 2.

The precoding method is characterized as follows. Preferably, the precoding matrix has the following features.

First of all, a diagonal element of the precoding matrix preferably has a constant amplitude, and more preferably, has the same amplitude.

Secondly, an amplitude of a diagonal element of the precoding matrix is equal to or greater than that of a residual element except the diagonal element.

Thirdly, an amplitude of a residual element of the precoding matrix except the diagonal element preferably becomes reduced if the residual element gets farther from the diagonal element.

In particular, assuming that an element of the precoding matrix is $a_{i,j}$ or $a_{p,q}$, if $|i-j| \leq |p-q|$, it is preferable that a relation of $|a_{i,j}| \geq |a_{p,q}|$ is maintained. In this case, the 'i', 'j', 'p' and 'q' are positive integers to indicate arbitrary matrix elements, respectively.

Fourthly, it is more preferable that an element except zero consecutively exists in either the residual element or the diagonal element. For instance, the precoding matrix prefers a formation of Formula 5 to that of Formula 4.

$$\begin{bmatrix} 1 & 0 & 0 & 0 & 0.2 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \qquad [\text{Formula 4}]$$

$$\begin{bmatrix} 1 & 0.7 & 0.6 & 0.3 & 0.2 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \qquad [\text{Formula 5}]$$

Fifthly, if an inverse matrix to the precoding matrix does not exist, a receiver may have difficulty in decoding the precoding. Hence, it is more preferable that the precoding matrix has its inverse matrix.

An example of a precoding matrix proposed by the present invention is explained as follows.

$$T_p = \begin{bmatrix} 1 & -1 & 0 & 0 & \dots & 0 \\ 0 & 1 & -1 & 0 & \dots & 0 \\ 0 & 0 & 1 & -1 & \dots & 0 \\ \vdots & \vdots & \vdots & \ddots & \ddots & \vdots \\ 0 & 0 & 0 & \dots & 1 & -1 \\ 0 & 0 & 0 & \dots & 0 & 1 \end{bmatrix} \qquad [\text{Formula 6}]$$

The precoding matrix is the matrix capable of meeting all of the above-explained conditions. The execution of the precoding by the above precoding matrix is equivalent to the execution of the precoding shown in FIG. 3. In case of using the precoding matrix, the precoding operation can be implemented by a simple configuration shown in FIG. 3. And, the coding matrix of Formula 6 is advantageous in facilitating real implementation.

Figure 3:
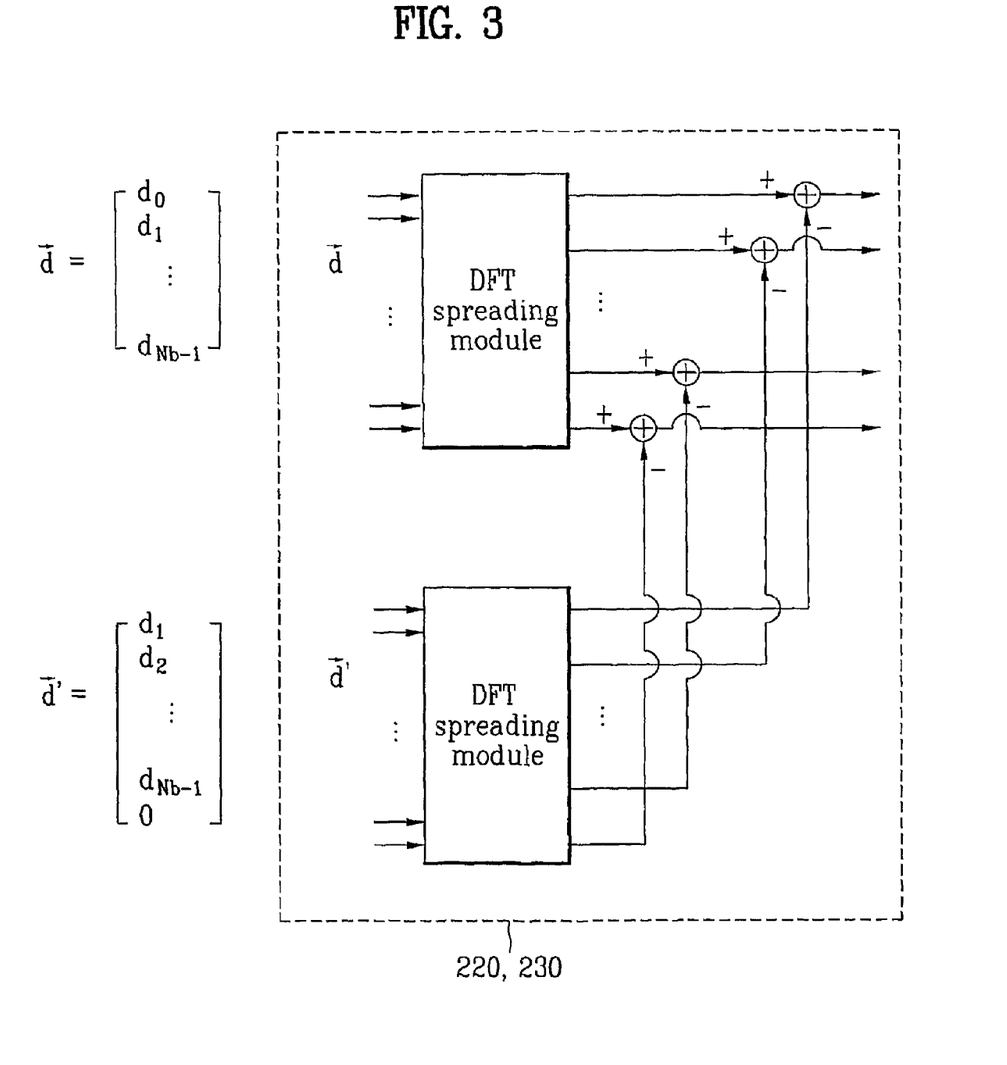
FIG. 3 is a detailed block diagram of a transmitter to implement one embodiment of the present invention.

FIG. 3 shows the precoding module 220 and the DFT spreading module 230.

Referring to FIG. 3, a first output of the precoding module is determined as '$d_0-d_1$' that is a linear combination between the parallel data symbol $[d_0, d_1, d_2, \dots, d_{Nb-1}]T$ and weight vector $[1, -1, 0, \dots, 0]$. And, a first output of the precoding module is determined as '$d_1-d_2$' that is a linear combination between the parallel data symbol $[d_0, d_1, d_2, \dots, d_{Nb-1}]^T$ and weight vector $[0, 1, -1, \dots, 0]$. Namely, the precoding module 220 calculates an output signal through the linear combination between the parallel data symbol and the weight vector. In this case, the precoding matrix includes the weight vector.

Another example of the precoding matrix proposed by the present invention is explained as follows.

$$T_p(p) = \begin{bmatrix} 1 & -p & 0 & 0 & \dots & 0 \\ 0 & 1 & -p & 0 & \dots & 0 \\ 0 & 0 & 1 & -p & \dots & 0 \\ \vdots & \vdots & \vdots & \ddots & \ddots & \vdots \\ 0 & 0 & 0 & \dots & 1 & -p \\ 0 & 0 & 0 & \dots & 0 & 1 \end{bmatrix} \qquad [\text{Formula 7}]$$

In order for the precoding matrix to meet the conditions of the precoding matrix, it is preferable that a value of the p is equal to or smaller than 1. In this case, the p is an arbitrary value of real number and its value can be changed according to specific PAPR performance.

A further example of the precoding matrix proposed by the present invention is explained as follows.

$$T_p = \begin{bmatrix} 1 & -1 & 0 & 0 & \dots & 0 \\ 0 & 1 & 0 & 0 & \dots & 0 \\ 0 & 0 & 1 & -1 & \dots & 0 \\ \vdots & \vdots & \vdots & \ddots & \ddots & \vdots \\ 0 & 0 & 0 & \dots & 1 & 0 \\ 0 & 0 & 0 & \dots & 0 & 1 \end{bmatrix} \qquad [\text{Formula 8}]$$

In the precoding matrix, it is able to change performance of a receiving end by adjusting a count of '−1'. Of course, by adjusting the precoding matrix, PAPR performance of a transmission signal is varied. A count of non-zero elements (diagonal element excluded) of Formula 8 is smaller than that of Formula 6. In particular, if precoding is carried out by the precoding matrix of Formula 6, more symbols are added to configure one output symbol. Yet, if precoding is carried out by the precoding matrix of Formula 8, less symbols are added to configure one output symbol. Consequently, the precoding according to Formula 6 decreases inter-symbol independency, whereas the precoding according to Formula 8 increases inter-symbol independency. Hence, it is able to control the inter-symbol independency according to precoding in a manner of adjusting a count of the non-zero elements of the precoding matrix.

As mentioned in the foregoing description, it is able to encode the parallel data symbol using the precoding matrix. In FIG. 2, the precoding module 220 is placed ahead of the DFT spreading module 230 to perform the precoding in time domain. Yet, the precoding module is able to perform the precoding in frequency domain by being placed behind the DFT spreading module 230.

Figure 4:
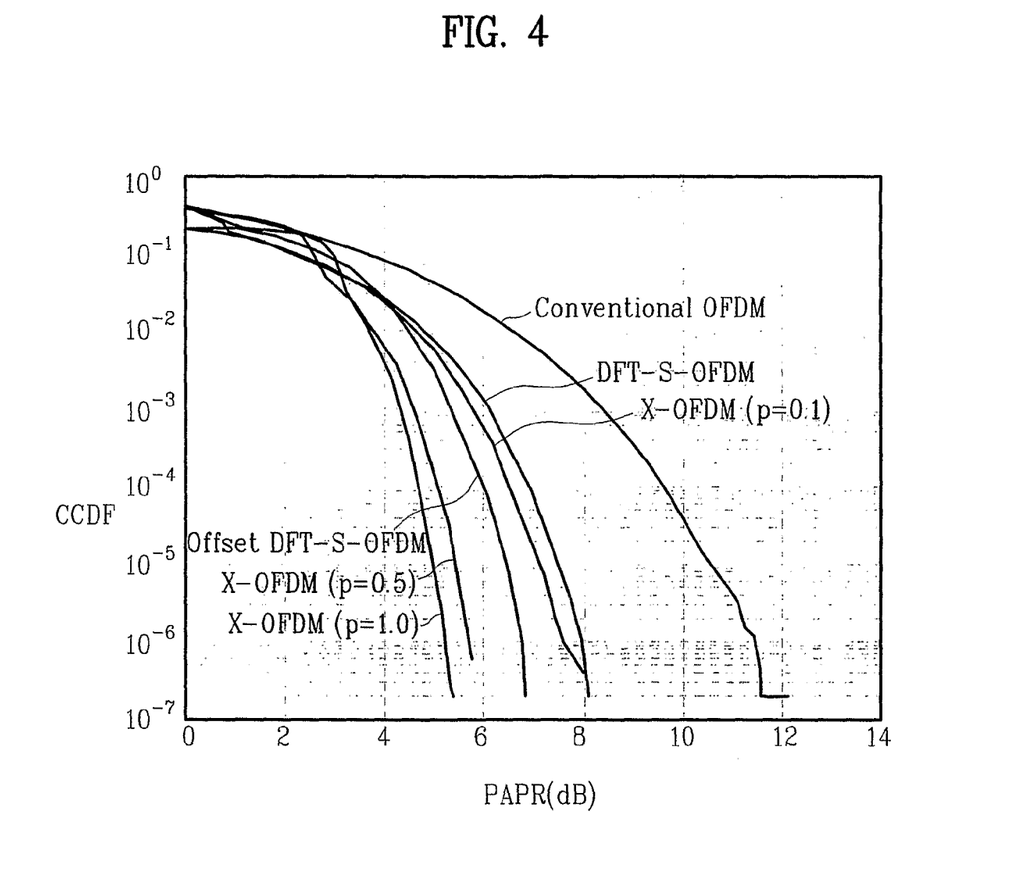
FIG. 4 is a graph to explain information for the enhancement of PAPR in case of performing precoding according to one embodiment of the present invention.

FIG. 4 is a graph to explain information for the enhancement of PAPR in case of performing precoding according to one embodiment of the present invention.

Referring to FIG. 4, if precoding is performed using a precoding matrix including an element of which amplitude is adjustable by the value of 'p' shown in Formula 7, it can be seen that PAPR is enhanced according to the value of 'p'.

A result of FIG. 4 corresponds to a case that the 'N' is 512, a case that the Nb is 256, and a case that subcarriers for a user are continuous.

If precoding is carried out in time domain by the method of the present invention, a PAPR reducing rate of the present invention is better than that of the related art. In particular, when data are transceived by the method according to one embodiment of the present invention, if PAPR is about 2 dB to 4 dB, it can be seen that a value of CCDF (complementary cumulative distribution function) is abruptly reduced. Thus, in case that PAPR is abruptly reduced, a cubic metric is enhanced as well as the PAPR is reduced. In this case, the PAPR and the cubic metric are defined as Formula 9.

$$PAPR = \frac{\max_{k=0,\ldots,N-1} |x_k|^2}{\frac{1}{N}\sum_{k=0}^{N-1} |x_k|^2},$$

$$\text{Cubic metric} = \frac{\max_{k=0,\ldots,N-1} |x_k|^3}{\frac{1}{N}\sum_{k=0}^{N-1} |x_k|^3}$$

[Formula 9]

In Formula 9, '$x_k$' indicates a signal generated from transforming a data symbol in time domain and 'N' indicates a count of subcarriers carrying the data symbol.

Figure 5:
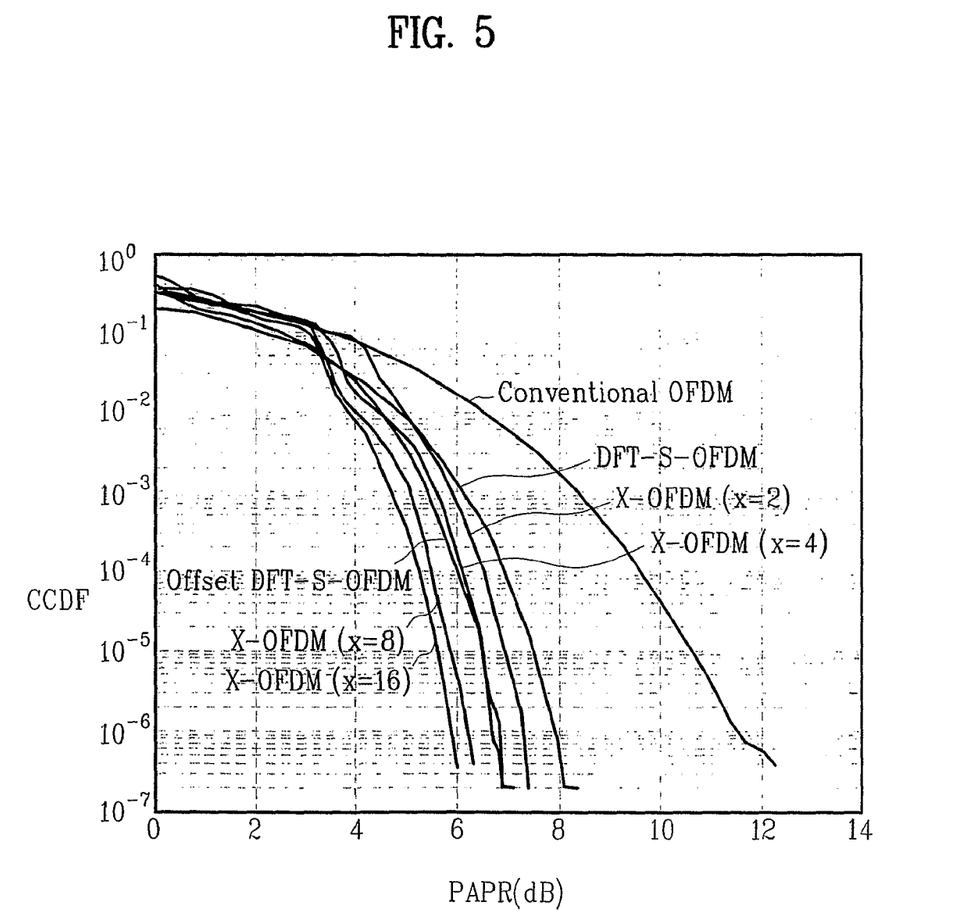
FIG. 5 is another graph to explain information for the enhancement of PAPR in case of performing precoding according to one embodiment of the present invention.

FIG. 5 is another graph to explain information for the enhancement of PAPR in case of performing precoding according to one embodiment of the present invention.

Referring to FIG. 5, performance of the embodiment (X-OFDM) of the present invention is enhanced better than those of the related arts.

In FIG. 5, 'x' is a variable that indicates how many spaces are needed to omit '−1' in case of using the precoding matrix having such a formation as that of Formula 8. For instance, if X=2, '−1' element exists in one row and the '−1' element does not exist in a next row. And, this rule is repeated. For instance, if X=4, '−1' elements exist in three rows, respectively and the '−1' element does not exist in a next row. And, this rule is repeated. So, by adjusting the 'x', it is able to control the inter-symbol independency by the precoding. Namely, FIG. 5 shows the PAPR enhancement rate according to the controlled inter-symbol independency. A result of FIG. 5 corresponds to a case that the 'N' is 512, a case that the Nb is 256, and a case that subcarriers for a user are continuous.

If precoding is carried out in time domain by the method of the present invention, a PAPR reducing rate of the present invention is better than that of the related art. In particular, when data are transceived by the method according to one embodiment of the present invention, if PAPR is about 2 dB to 4 dB, it can be seen that a value of CCDF (complementary cumulative distribution function) is abruptly reduced. Thus, in case that PAPR is abruptly reduced, a cubic metric is enhanced as well as the PAPR is reduced.

Industrial Applicability

Accordingly, the present invention provides the following effects.

First of all, PAPR is enhanced by performing precoding in time domain.

Secondly, if precoding is carried out using a precoding matrix, it is able to control a PAPR enhancement rate.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting signals by a user equipment, the method comprising:

performing a Discrete Fourier Transform (DFT) of a plurality of uplink data symbols at a DFT module to produce a transformed plurality of uplink data symbols;

precoding the transformed plurality of uplink data symbols at a precoder by multiplying a vector of the transformed plurality of uplink data symbols by a precoding matrix;

mapping the precoded plurality of uplink data symbols to a plurality of subcarriers at a mapper;

transforming the mapped plurality of uplink data symbols to produce a time domain signal at a transformer; and transmitting the time domain signal to a base station, wherein a number of rows of the precoding matrix is equal to a number of columns of the precoding matrix, and wherein amplitudes of diagonal elements of the precoding matrix are greater than amplitudes of all residual elements not including the diagonal elements.

2. The method of claim 1, wherein the amplitudes of the diagonal elements of the precoding matrix are equal to one another.

3. The method of claim 1, wherein, if elements of the precoding matrix are $a_{i,j}$ and $a_{p,q}$ and $|i-j| \leqq |p-q|$, the precoding matrix maintains a relation of $|a_{i,j}| \geqq |a_{p,q}|$, and wherein i, j, p and q are integers.

4. A user equipment for transmitting signals, the user equipment comprising:

a Discrete Fourier Transform (DFT) module for performing a DFT of a plurality of uplink data symbols to produce a transformed plurality of uplink data symbols;

a precoder coupled to an output of the DFT module and for precoding the transformed plurality of uplink data symbols by multiplying a vector of the transformed plurality of uplink data symbols by a precoding matrix;

a mapper coupled to an output of the precoder and for mapping the precoded plurality of uplink data symbols to a plurality of subcarriers;

a transformer coupled to an output of the mapper and for transforming the mapped plurality of uplink data symbols to produce a time domain signal; and a transmitter for transmitting the time domain signal to a base station, wherein the precoding matrix has a form of a square matrix, wherein amplitudes of diagonal elements of the precoding matrix are greater than amplitudes of all residual elements not including the diagonal elements.

5. The user equipment of claim 4, wherein the amplitudes of the diagonal elements of the precoding matrix are equal to one another.

6. The user equipment of claim 4, wherein, if elements of the precoding matrix are $a_{i,j}$ and $a_{p,q}$ and $|i-j| \leq |p-q|$, the precoding matrix maintains a relation of $|a_{i,j}| \geq |a_{p,q}|$, and wherein i, j, p and q are integers.

\* \* \* \* \*